United States Patent [19]

Conachen

[11] Patent Number: 4,830,555

[45] Date of Patent: May 16, 1989

[54] GUIDE FOR WINDOW GROUTING DEVICE

[76] Inventor: James A. Conachen, 12 Meadow Rd., Sharon, Mass. 02067

[21] Appl. No.: 142,840

[22] Filed: Jan. 11, 1988

[51] Int. Cl.[4] .................................................. B23C 3/00

[52] U.S. Cl. .................................... 409/178; 409/182; 144/136 C; 408/115 R; 408/72 R

[58] Field of Search ........................ 409/178, 181, 182; 144/136 C, 1 E, 1 F; 408/115 R, 72 R; 29/33

[56] References Cited

U.S. PATENT DOCUMENTS

| | | | |
|---|---|---|---|
| 3,327,573 | 6/1967 | Prussiano | 408/115 R |
| 4,132,254 | 1/1979 | Shockovsky | 144/136 C |
| 4,273,483 | 6/1981 | Mendicino | 144/136 C |
| 4,281,694 | 8/1981 | Gorman | 409/182 |
| 4,355,557 | 10/1982 | Mecsey | 144/136 C |

*Primary Examiner*—Bruce Y. Arnold
*Assistant Examiner*—R. D. Shafer
*Attorney, Agent, or Firm*—Donald W. Meeker

[57] ABSTRACT

A cutting tool guide device fits within a window frame in a vertically mounted position. The device guides a cutting tool, such as a router, along the X,Y, and Z coordinates. Simultaneous movement along the X and Y coordinates parallel to the window is possible by means of vertical and horizontal controls which allows any angle or curves to be followed. Measured adjustment along the Z coordinate, perpendicular to the window, is provided by a screw threaded router tool casing mounted in a collar with external measured detentes contacted by a spring loaded ball. Rotary movement of the router is restrained by a slot in the router receiving a-pin. Great precision is obtained in removing glazing from a window sash and in cutting into the rabbit joint of the sash. The cutting allows double pane glass to be inserted into the sash. The cutting tool guide device is adjustable to fit into various sized window frames. Resilient material at the points where the guide device contacts the window frame in a tensioned relationship prevents harm to the window frame. The guide device may be mounted on a separate frame to hold a window which has been removed from a building.

11 Claims, 2 Drawing Sheets

30 31 35 31 30 10 18 80 47 46 48 44 50B 70 62 60 42 42 68 68 31 64 70 11 12 68 68 14 62 21 22 15 42 80 42 31 35 31 16 30 30

GUIDE FOR WINDOW GROUTING DEVICE

BACKGROUND OF THE INVENTION

Technical Field

The present invention relates to a guiding and cutting device which by a first operation removes glazing thereby allowing removal of the original glass and which by a second operation cuts into the rabbit joint of a sash to allow insertion of double pane glass. The present invention is designed to operate in a vertical position mounted on a window frame or mounted on a separate rack holding the window vertically.

BACKGROUND ART

Conservation of energy is an important consideration of a building owner. Large amounts of heat (in the winter) and cool air (in the summer) are lost because of single pane glass in the windows. This energy loss is increased when the glazing becomes old and brittle leaving cracks between the glass and the sash. Reduction of energy loss via windows is desirable.

Removing the old windows and replacing them with new windows is expensive and may not be cost effective.

Removing the old glazing by a hand tool often results in damage to the sash or in the worker hurting his hand.

Removing the old glazing by a tool such as a router requires a guide to avoid harm to the sash. Previous guides allow the router to be used in only one direction along a straight line. The guide must then be moved to allow the router to be used in another direction. Requiring the guide to be constantly moved is time consuming. Pins or other sharp objects are commonly used to hold the guide in position and these objects often harm the sash or window frame. Curved sashes are difficult to do as previous guides allow the router to be used only in a straight line.

Conventional routers operating on a horizontal plane are not effective for working on windows on a building requiring a vertically mounted guiding device.

DISCLOSURE OF THE INVENTION

A cutting tool guide device which adapts to clamp onto window frames of various sizes permits the removal of glazing compound. This first operation is performed without harming the sash, glass, or operator. If the original glass was double pane glass, the glass is then replaced, if necessary, and the new glazing applied. If the original glass was not double pane glass, a second operation is performed upon the sash by the cutting tool as guided by the guide system. In this second operation a cut is made into the rabbit joint of the sash to allow insertion of double pane glass.

In both operations, precision cutting is required and obtained using the guide device. Once the guide device is properly positioned, it remains in position throughout both operations with guide members moving to allow the X-Y-Z coordinates of the cutting tool to be changed to follow the sash even if the sash is curved. A router tool guide frame having both vertical and horizontal bars along which to slide the router tool permits full flexibility of movement over the full plane of the window in any direction or movement pattern: horizontal, vertical, angled or arched. Interchangeable cutting tools allow large changes in the Z-coordinate perpendicular to the glass to be performed quickly, particularly the adjustment in depth which must be made between the upper and lower panes in a double hung sliding window.

The guide device is held in position by blocks of resilient material extending from the guide device. These blocks securely hold the guide device in position without harming the window frames.

By providing positive gripping clamps and locking devices around each frame element of the guide system, the present invention operates by attaching the guide device vertically on a window frame in place on a building or vertically on a separate frame holding the window. The vertical orientation provides ease of operation by standing in front of the window to reach easily in all directions, saving back injury and back pain.

BRIEF DESCRIPTION OF THE DRAWINGS

These and other details and advantages of my invention will be described in connection with the accompanying drawings, which are furnished only by way of illustration and not in limitation of the invention, and in which drawings.

BEST MODE FOR CARRYING OUT THE INVENTION

Figure 1:
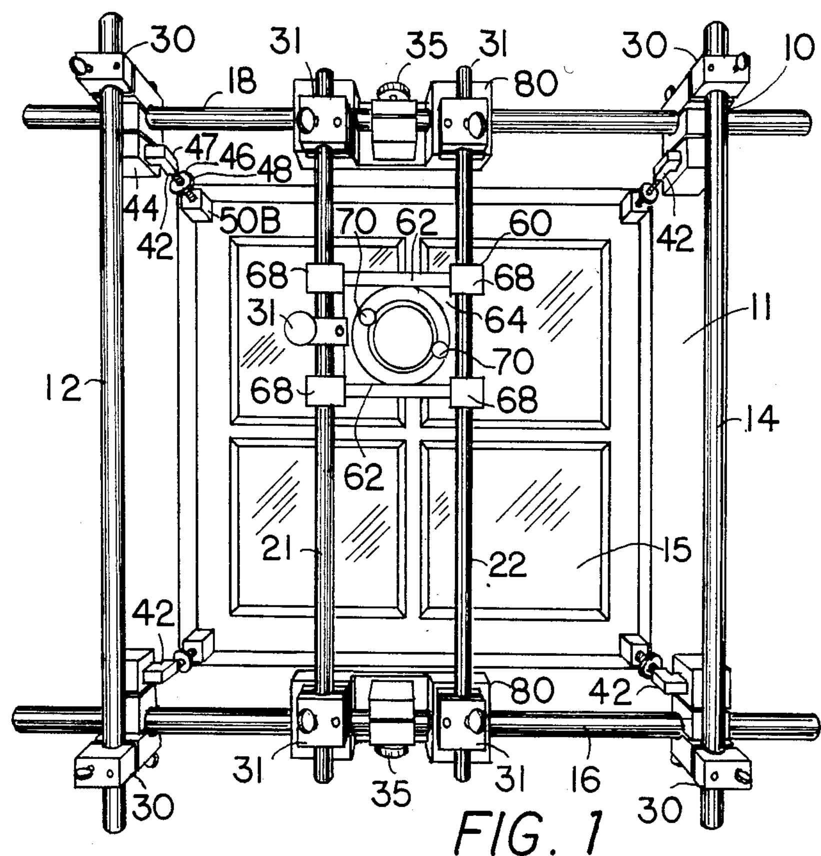
FIG. 1 is a front elevational view showing the invention mounted on the exterior of a window.

FIG. 1 shows a front elevational view of the guide device 10 positioned in window frame 11. The guide device 10 has a guide frame 13 formed by vertical frame members 12 and 14 and horizontal frame members 16 and 18.

These vertical and horizontal frame members are held in a substantially perpendicular relationship by connecting means 30. The preferred embodiment of the connecting means 30 is disclosed in FIGS. 2 and 3 as an adjustable connecting means 30A. Vertical connecting block 31 has a first half 32 and a second half 34 which form a vertical gripping hole 33 therebetween, a first shoulderbolt 36 and a first reversible tightening means shown here as a first thumbscrew 38 which screws into threaded opening 40. The vertical frame member 12 or 14 is gripped by the gripping hole 33 when the thumbscrew is tightened. This takes up the play. The play allows the adjustable connecting means 30A to slide easily along the vertical frame member. Using shoulder bolt 36 allows adjustment to be made by loosening or tightening one reversible tightening means.

The horizontal connecting block 35 is similar to the vertical connecting block except that the gripping hole 45 grips the horizontal frame member 16 or 18. Either the first half 37 or the second half 39 of the horizontal connecting block 35 is integrally manufactured with or secured by known means to the second half 34 of the vertical connecting lock 31 as shown in FIG. 3.

Figure 2:
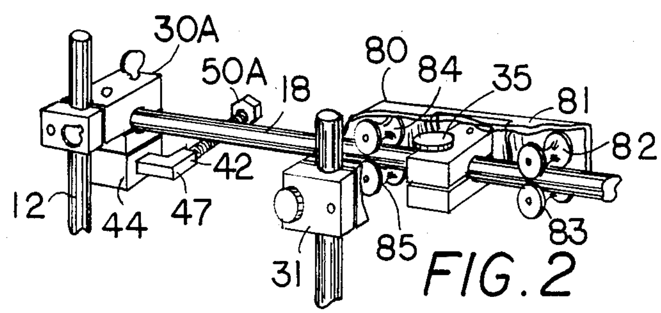
FIG. 2 is a partial perspective view of a corner of the guide frame showing corner connecting blocks and horizontal bar connecting blocks.
Figure 3:
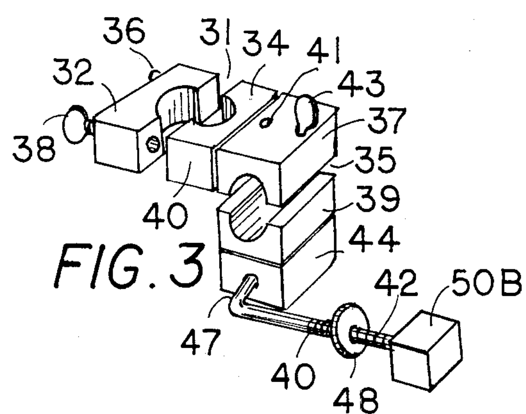
FIG. 3 is an exploded partial perspective view of a corner connecting block assembly.

FIGS. 2 and 3 also show the preferred embodiment of the securing means 42 which secures the guide frame to the window frame. An extension block 44 extends from the second half 39 of the horizontal connecting block 35 at each of the four corners of the guide frame. An extending rod 47 from each extension block is provided with a contact means such as the teflon block 50B in FIG. 3 or the bolt end 50A in FIG. 2. Each contact means fits into a corner of each window frame so that when the joints at the four corners of the frame are tightened a tension is created which secures the guide frame to the window frame. The contact means has a threaded rod 46 which is screwed into the extending rod 47 so that the contact means may be adjusted to windows of varying depths and secured tightly by an adjusting nut 48.

FIGS. 1 and 2 show the horizontal guide means 80. A+ the top and bottom of the vertical cutting tool guides 21 & 22, adjustable split blocks 31 connect the ends of the guides to a wheel encasement 81 which maintains the cutting tool guides in a spaced parallel relationship by acting as a connecting member. Within the encasement 81 are one or preferably two pair of wheels 82 and 83 and 84 and 85, which are provided with grooves to ride on the horizontal member 18. To provide greater stability, top wheels 82 & 84 and bottom wheels 83 & 84 are cambered in opposite directions. This is accomplished by having the wheels slightly off center when the contact the horizontal member. A throughbolt clamp 35 with an adjusting knob provides the means to secure the cutting tool guides in a stationary position when only vertical movement of the router is desired by deforming the encasement 81. An identical arrangement would exist at the bottom of the cutting tool guides relative to the bottom horizontal member. The encasement 81 also prevents cut grouting wood and sawdust from hampering the motion of the wheels.

Figure 4:
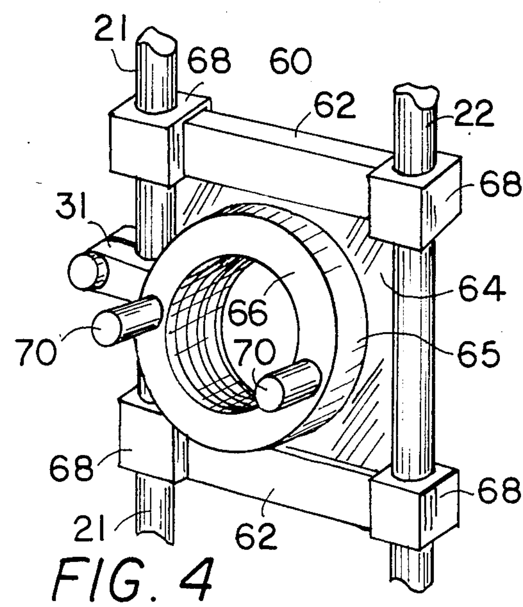
FIG. 4 is a partial perspective view showing the cutting tool holding member and its vertical sliding blocks.

FIGS. 1 and 4 show the cutting tool holding member 60. Bushings 68 are connected by support members 62 horizontally positioned therebetween. Bushings 68 are free to slide along vertical guide members 21 & 22. The bushings are split (preferably in a spiral configuration) to allow expansion and contraction for ease of movement at any temperature. Plate 64 is attached between support members 62. A vertical connecting block 31 is attached to a side of plate 64. This vertical connecting block 31 serves to lock the cutting tool holding members 60 in position when desired. The operation of the vertical connecting block 31 has previously been described. Parts 70 extend from the cutting tool holding member 60 and are used as handles to move the cutting tool holding member 60. Opening 65 in plate 64 has a collar 66 which adjustably and removably holds the cutting tool 20.

Figure 5:
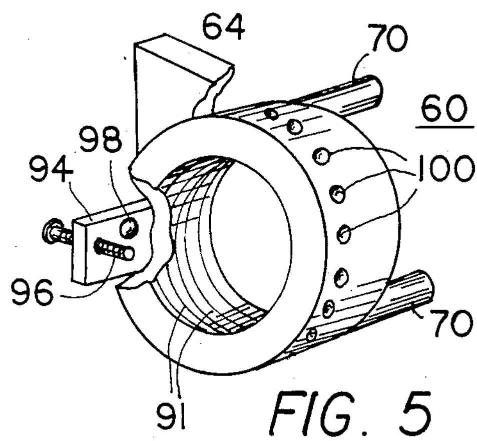
FIG. 5 is an exploded perspective view of the opposite side of the cutting tool holding member.
Figure 6:
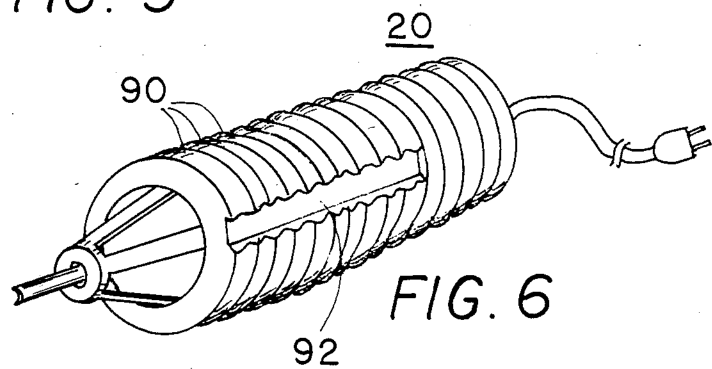
FIG. 6 is a perspective view of the cutting tool or router.

While the means for adjustably and removably holding the cutting tool 20 in the collar 66 are varied, the preferred embodiment is described in FIGS. 5 and 6. Preferrably the collar 66 rotates relative to the opening 65. Z-coordinate controlling member 94 extends from the plate 64 adjacent to collar 66. The Z-coordinate controlling member 94 has a thumbscrew 96 extending therethrough and a spring-biased ball 98. The cutting tool 20, shown in FIG. 6 as a router, has threads 90 which mate with threads 91 of the collar 66. After the cutting tool 20 is threaded into the collar 66, key slot 92 is aligned with thumbscrew 96, and thumbscrew 96 is inserted into key slot 92. Spring biased ball 98 is biased by the spring to mate with one of the detents 100. When the collar 66 is rotated, the spring of the spring-biased ball 98 is overcome until a detent 100 is aligned with the ball 98. The thumbscrew 96 and mating key slot 92 prevent the cutting tool 20 from rotating with the collar 66 when the collar 66 is rotated. The cutting tool 20 is moved closer to or farther from the sash along the Z-coordinate depending upon the direction of rotation of the collar 66. By having each detent 100 represent a known distance of movement of the cutting tool 20 along the Z-coordinate the required precision is obtained. It has been found that 1/64 of an inch is a convenient distance.

Figure 7:
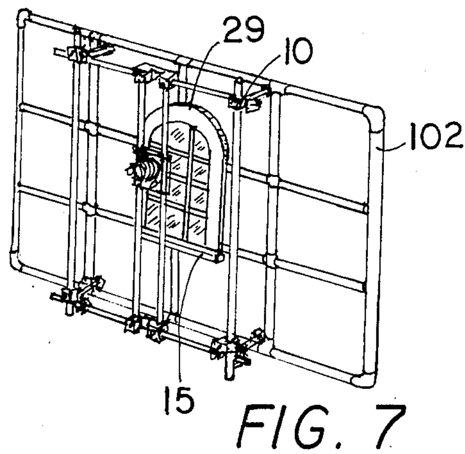
FIG. 7 is a perspective view of the guide frame mounted on a portable frame for holding windows.

In FIG. 7, the window 15 may be removed from the building and mounted on a movable frame 102, such as a frame used in transporting glass, on the ground or some other convenient location, rather than working on the window while still on the house as in cases of excessive heights or bad weather. The rectangular frame 10 of the invention is then mounted on the movable frame 102 and operated in a similar manner as when the frame 10 is mounted on a house. The movable frame 102 is positioned vertically. Having the frame 102 positioned vertically allows the user to stand upright to relieve back stress as opposed to having the frame 102 positioned horizontally with the user bending over it.

Clamping the horizontal control only, permits vertical motion of the cutting tool. Clamping the vertical control only, permits horizontal motion of the cutting tool.

Simultaneous release of both horizontal and vertical controls permits motion at any angle or over any curved surface as in the case of arched windows 29, in FIG. 7.

Windows having odd shaped window frames can be worked on by temporarily adding molding to make or extend a rectangular window frame as shown in FIG. 7.

It is understood that the preceding description is given merely by way of illustration and not in limitation of the invention and that various modifications may be made thereto without departing from the spirit of the invention as claimed.

I claim:

1. A guiding and cutting device for a sash, the device comprising:

a substantially rectangular frame including first and second vertical frame members, and first and second horizontal frame members positioned between and substantially perpendicularly to the first and second vertical frame members thereby forming the frame;

connecting means connecting the vertical frame members to the horizontal frame members at each of four corners formed by intersection of the vertical and horizontal members;

a guide means movably mounted between two opposing frame members parallel to the plane of the rectangular frame wherein slidable clamping means encircle the frame members to secure the guide means to the frame members;

a cutting tool holding member movably mounted to the guide means to provide motion along the guide means wherein slidable clamping means from the cutting tool holding member encircle the guide means to mount the cutting tool holding member to the guide means;

a cutting tool movably mounted to the cutting tool holding member, wherein the cutting tool moves adjustably within the cutting tool holding member in a direction perpendicular to the guide means;

a securing means attached to the frame at each of four corners of the rectangular frame for non-destructively securing the rectangular frame to each of four corners of a window frame by tension between the securing means and the corner of the window frame;

wherein the guide means comprises:

a first and second vertical guide having the cutting tool holding means positioned therebetween;

a horizontal guide means secured at each of two ends of the vertical guides for guiding the first and second vertical guide members along the first and second horizontal frame members and between the first and second vertical frame members;

a vertical guide means for guiding the cutting tool holding means between the first and the second vertical guide members;

wherein the first and second horizontal frame members are first and second horizontal frame rods and the horizontal guide means comprises:

a top connecting member connecting a top of the first and second vertical guide members;

a bottom connecting member connecting a bottom of the first and second vertical guide members;

wheel assemblies extending from the top and bottom connecting members and rollably engaging the adjacent horizontal frame rod, wherein each wheel assembly comprises:

a top wheel positioned on top of the horizontal frame rod and a bottom wheel positioned under the horizontal frame rod, each wheel having a groove in which the horizontal frame rod fits.

2. The invention of claim 1 wherein the top wheel and the bottom wheel are combered in opposite directions.

3. The invention of claim 1 further comprising a second top and bottom wheel mounted above and below the horizontal frame rod and spaced away from the top and bottom wheel.

4. The invention of claim 1 wherein the first and second guide members are first and second vertical guide rods and the vertical guide means comprises bushings attached to the cutting tool holding means.

5. A guiding and cutting device for a sash, the device comprising:

a substantially rectangular frame including first and second vertical frame members, and first and second horizontal frame members positioned between and substantially perpendicularly to the first and second vertical frame members thereby forming the frame;

connecting means connecting the vertical frame members to the horizontal frame members at each of four corners formed by intersection of the vertical and horizontal members;

a guide means movably mounted between two opposing frame members parallel to the plane of the rectangular frame wherein slidable clamping means encircle the frame members to secure the guide means to the frame members;

a cutting tool holding member movably mounted to the guide means to provide motion along the guide means wherein slidable clamping means from the cutting tool holding member encircle the guide means to mount the cutting tool holding member to the guide means;

a cutting tool movably mounted to the cutting tool holding member, wherein the cutting tool moves adjustably within the cutting tool holding member in a direction perpendicular to the guide means;

a securing means attached to the frame at each of four corners of the rectangular frame for non-destructively securing the rectangular frame to each of four corners of a window frame by tension between the securing means and the corner of the window frame;

wherein the guide means comprises:

a first and second vertical guide having the cutting tool holding means positioned therebetween;

a horizontal guide means secured at each of two ends of the vertical guides for guiding the first and second vertical guide members along the first and second horizontal frame members and between the first and second vertical frame members;

a vertical guide means for guiding the cutting tool holding means between the first and the second vertical guide members;

wherein the cutting tool holding member comprises:

a plate having an opening;

a holding means to hold a cutting tool in the opening;

first and second support members connected to opposite edges of the plate;

bushing members attached to the ends of the first and second support members, the bushing members being slideable upon the first and second vertical guide members;

a releasible lock means attached to an edge of the plate adjacent to the vertical guide member for locking the cutting tool holder in a fixed position, when desired;

wherein the holding means comprises:

a cylindrical collar having a central opening communicating between the ends of the collar and the central opening; the collar receiving removeably a cutting tool;

positioning means for positioning the central opening of the collar over the opening of the plate;

a Z-coordinate controlling means for controlling the Z-coordinate of the cutting tool allowing measured motion of the cutting tool in a direction perpendicular to the rectangular frame;

wherein the Z-coordinate controlling means comprises:

a series of Z-coordinate controlling detents on the exterior of the collar;

a Z-coordinate control member connected to the plate and adjacent to the collar, the Z-coordinate control member having a spring-loaded ball which removably engages the desired extent.

6. The invention of claim 5 wherein the Z-coordinate controlling detents are positioned at known distances apart along the circumference of the collar.

7. A guiding and cutting device for a sash, the device comprising:

a substantially rectangular frame including first and second vertical frame members, and first and second horizontal frame members positioned between and substantially perpendicularly to the first and second vertical frame members thereby forming the frame;

connecting means connecting the vertical frame members to the horizontal frame members at each of four corners formed by intersection of the vertical and horizontal members;

a guide means movably mounted between two opposing frame members parallel to the plane of the rectangular frame wherein slidable clamping means encircle the frame members to secure the guide means to the frame members;

a cutting tool holding member movably mounted to the guide means to provide motion along the guide means wherein slidable clamping means from the cutting tool holding member encircle the guide means to mount the cutting tool holding member to the guide means;

a cutting tool movably mounted to the cutting tool holding member, wherein the cutting tool moves adjustably within the cutting tool holding member in a direction perpendicular to the guide means;

a securing means attached to the frame at each of four corners of the rectangular frame for non-destructively securing the rectangular frame to each of four corners of a window frame by tension between the securing means and the corner of the window frame;

wherein the connecting means is an adjustable connecting means comprising;

a vertical connecting block including a first half of the vertical connecting block, a front and a back side of the first half of the vertical connecting block, a second half of the vertical connecting block, a front and a back side of the second half of the vertical connecting block wherein a vertical gripping hole is formed by the back side of the first half and the front side of the vertical connecting block, a first shoulder bolt connecting the first and second half of the vertical connecting block;

a first reversible tightening means, whereby tightening the first tightening means results in the vertical gripping hole gripping the vertical frame member;

a horizontal connecting block including a first half of the horizontal connecting block, a top and a bottom side of the first half of the horizontal connecting block, a second half of the horizontal connecting block, a top and a bottom side of the second half of the horizontal connecting block, wherein a horizontal gripping hole is formed by the bottom side of the first half and the top side of the second half of the horizontal connecting block, and a second shoulder bolt connecting the first and second half of the horizontal connecting block; and a second tightening means whereby tightening the second tightening means results in the horizontal gripping hole gripping the vertical frame member.

8. The invention of claim 7 wherein the first and second tightening means are first and second thumb screws.

9. The invention of claim 7 wherein the securing means comprises:

a block extension of the bottom of the horizontal connecting block;

a rigid protruding arm extending from the extension block toward the interior of the rectangular frame, wherein the protruding arm comprises:

a first arm segment attached to the block extension of the horizontal connecting block, the first length approximately paralleling the horizontal frame members;

a second arm segment attached to and substantially perpendicular to the first arm segment in a direction toward a window on which the rectangular frame is mounted; wherein the second arm segment comprises interior threads to receive a contact element; a contact element screwed adjustably into the second arm segment.

10. The invention of claim 9 wherein the contact element comprises;

an adjustable rod extending coaxially from the second arm segment;

a contact element attached to an end of the rod opposite the second arm segment.

11. The invention of claim 10 wherein the contact element comprises a teflon block.

* * * * *